US005616174A

United States Patent [19]

Kanaya et al.

[11] Patent Number: 5,616,174

[45] Date of Patent: Apr. 1, 1997

[54] INK COMPOSITION AND INK JET RECORDING METHOD USING THE SAME

[75] Inventors: Miharu Kanaya; Akio Owatari; Junko Takatsuna; Masahiro Yatake; Hiroko Hayashi, all of Suwa; Takashi Ono, Takatsuki; Yoshihiro Sawatari, Yawata; Tatsuya Yagyu, Neyagawa, all of Japan

[73] Assignee: Seiko Epson Corporation, Tokyo-To, Japan

[21] Appl. No.: 566,834

[22] Filed: Dec. 4, 1995

[30] Foreign Application Priority Data

Dec. 5, 1994 [JP] Japan .................................... 6-300695
Apr. 21, 1995 [JP] Japan .................................... 7-097238

[51] Int. Cl.$^6$ .................................... C09D 11/02

[52] U.S. Cl. .................... 106/22 K; 534/727; 534/810; 534/815; 534/809

[58] Field of Search .............................. 106/22 K, 22 H, 106/22 R; 534/727, 810, 815, 809

[56] References Cited

U.S. PATENT DOCUMENTS 5,034,058 7/1991 Akiyama .............................. 106/22 K
5,125,969 6/1992 Nishiwaki et al. .................. 106/22 K
5,156,675 10/1992 Breton .................................. 106/22 R
5,183,502 2/1993 Meichsner et al. .................. 106/22 K
5,397,386 3/1995 Nakazawa et al. .................. 106/22 K
5,478,384 12/1995 Takimoto et al. .................. 106/22 K

FOREIGN PATENT DOCUMENTS 391577 4/1991 Japan .
379681 4/1991 Japan .
4183761 6/1992 Japan .
673320 3/1994 Japan .
6172668 6/1994 Japan .

OTHER PUBLICATIONS

Patent Abstracts of Japan, JPO, pub. No. 0418376.1 A, Jun. 1992.

Patent Abstracts of Japan, JPO, pub. No. 03079681 A, Apr. 1991.

Derwent Abstracts, WPI Acc. No. 90334116/44 JP 3091577, Apr. 1991.

Patent Abstracts of Japan, JPO pub. No. 0607332.0 A, Mar. 1994.

Derwent Abstracts, WPI Acc. No. 94050786–07 JP 617266.8, Jun. 1994.

*Primary Examiner*—Helene Klemanski
*Attorney, Agent, or Firm*—Ladas & Parry

[57] ABSTRACT

An ink composition is provided which enables high-quality recording on plain paper and can record an image having excellent water resistance. The ink composition comprises a dye represented by the following formula (I):

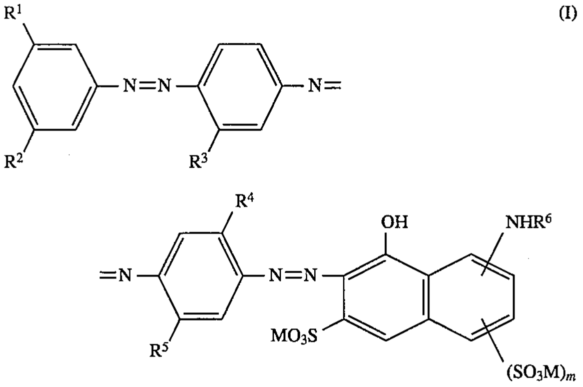

(I)

wherein M represents an unsubstituted or substituted ammonium, $R^1$ represents COOM, $R^2$ represents —P(=O)n—$(OM)_2$, where n is 0 or 1, $R^3$ represents $SO_3M$, $R^4$ and $R^5$ independently represent H, an alkyl group, or an alkoxyl group, $R^6$ represents H, a phenyl group which may be substituted, an alkylcarbonyl group, or an alkyl group which may be substituted with a hydroxyl or alkoxyl group, and m is 0 or 1.

10 Claims, No Drawings

INK COMPOSITION AND INK JET RECORDING METHOD USING THE SAME

BACKGROUND OF THE INVENTION

1. Field of the Invention

The present invention relates to an ink composition and an ink jet recording method using the same.

2. Background Art

An ink for use in an ink jet recording system generally comprises a solution of various dyes dissolved in water or an Organic solvent or a mixture thereof. In inks used in ink jet recording, however, various property requirements are more strict than those for inks used in writing utensils such as fountain pens and ball-point pens.

Properties required of the ink for ink Jet recording include that physical properties such as viscosity and surface tension are suitable; the optical density is high; sharp color tone and image can be provided; an image excellent in fastness properties, such as water resistance and light-fastness, can be provided; the Storage stability is excellent; clogging of nozzles is less likely to occur, and the scent and stability are good.

Most of these properties are satisfied by using a water-base ink prepared by dissolving a water-soluble dye in water or a mixture of water with a water-soluble organic solvent. Therefore, improvements have been made in the water-base ink for ink jet printing method.

For example, an attempt to improve the penetration of the ink has been made in order to rapidly fix the ink onto paper. Regarding this, Japanese Patent Laid-Open No. 183761/1992 and U.S. Pat. Nos. 5,183,502 and 5,156,675 disclose the addition of diethylene glycol monobutyl ether and the addition of both a glycol ether and a nonionic acetylene glycol surfactant. However, it is sometimes impossible to realize an excellent color development and image density, i.e., a sharp image, because these inks may well penetrate into paper. In order to solve this problem, increased dye concentration might be effective. However, the high concentration of the dye may increase solid content which may cause precipitation in the vicinity of a nozzle, which is causative of clogging of the nozzle. Further increasing the amount of a wetting agent for preventing clogging of the nozzle increases the viscosity of the ink, which is disadvantageous particularly in the ink jet recording system.

Moreover, since properties of the ink, such as color tone, water resistance, and light fastness, are influenced greatly by the properties of the dye, studies have been made on dyes. Further, there is an ever-increasing demand particularly for water resistance of prints among various ink properties. For example, Japanese Patent Laid-Open Nos. 79681/1991, 91577/1991, 73320/1994, and 172668/1994 disclose that an ink composition having good water resistance can be provided by using a particular dye.

However, there is room for improvement in various properties of these ink compositions.

SUMMARY OF THE INVENTION

An object of the present invention is to provide an ink composition which can satisfy various property requirements for an ink for ink jet recording, particularly an ink composition which enables high-quality recording on plain paper and can record an image having water resistance.

We have now found that the object can be attained by using a specific dye.

Specifically, the present invention provides an ink composition comprising a dye represented by the following formula (I):

(I)

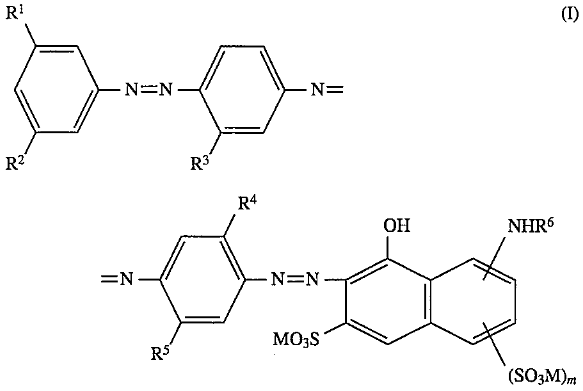

wherein M represents H, an alkali metal, an unsubstituted or substituted ammonium, morpholinium, or piperidinium;

$R^1$ represents H, $NH_2$, or COOM where M is as defined above;

$R^2$ represents COOM or —P(=O)n—$(OM)_2$ where M is as defined above and n is 0 or 1;

$R^3$ represents H, COOM, or $SO_3M$ where M is as defined above;

$R^4$ and $R^5$ each independently represent H, an alkyl group having 1 to 6 carbon atoms, or an alkoxyl group having 1 to 6 carbon atoms;

$R^6$ represents H, a phenyl group which may be substituted, an alkylcarbonyl group, or an alkyl group which may be substituted with a hydroxyl or alkoxyl group; and m is 0 or 1.

DETAILED DESCRIPTION OF THE INVENTION

In this disclosure, the alkyl as a group or a part of a group may be straight or branch chained.

In the formula (I), M represents H, an alkali metal, an unsubstituted or substituted ammonium, morpholinium, or piperidinium. The alkali metal represented by M is preferably lithium, potassium, or sodium. The substituent in the substituted ammonium is preferably an alkyl group, having 1 to 6 carbon atoms (preferably 1 to 4 carbon atoms), which may be substituted with a hydroxyl group.

Preferred examples of an amine which forms the substituted ammonium as M include methylamine, dimethylamine, trimethylamine, ethylamine, diethylamine, triethylamine, propylamine, isopropylamine, dipropylamine, diisopropylamine, butylamine, isobutylamine, secbutylamine, tert-butylamine, and dibutylamine. The dye used in the present invention is not limited to a single salt of any of an ammonium salt, a substituted ammonium salt, a morpholinium salt, and a piperidinium salt and may be a mixture thereof with an alkali metal salt. According to the preferred embodiment of the present invention, the ratio of the number of M's which are an alkali metal salt to all the number of M's in the dye represented by the formula (I) is not more than 50%.

The dye represented by the formula (I) can form a print having excellent water resistance. Further, when the dye is in the form of a salt with the amine, the water resistance is further improved. The reason for this might be considered as follows. The amine is generally volatile and, hence, evaporates from on paper. As a result, the M in the formula (I) becomes H, forming a carboxyl or sulfonic group. The dissociation constant of the carboxyl group is generally so small that, even when water is deposited on recorded paper, the dye represented by the formula (I) is less likely to be redissolved in the deposited water. Thus, improved water resistance of the print is realized.

In the formula (I), at least one hydrogen atom in the phenyl group as $R^6$ may be substituted, and preferred examples of the substituent include a carboxyl group. The carboxyl group may be in an ammonium salt form. The alkyl group portion in the alkylcarbonyl group as $R^6$ is preferably an alkyl group having 1 to 6 carbon atoms, still preferably 1 to 4 carbon atoms. At least one hydrogen atom in the alkyl group may be substituted, and examples of the substituent include a hydroxyl group or an alkoxyl group (preferably an alkoxyl group having 1 to 6 carbon atoms, still preferably an alkoxyl group having 1 to 4 carbon atoms).

Specific preferred examples of the compound represented by the formula (I) used in the present invention are listed in the following tables.

| | $R^1$ | $R^2$ | $R^3$ | $R^4$ | $R^5$ | Ar |
|---|---|---|---|---|---|---|
| 1. | H | 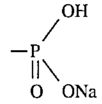 | H | $CH_3$ | H | 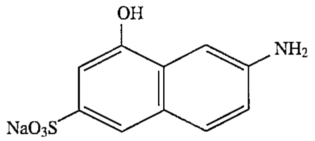 |
| 2. | H | 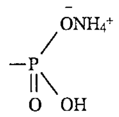 | H | $OCH_3$ | $CH_3$ | 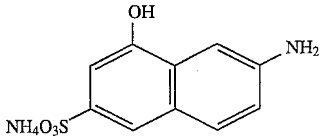 |
| 3. | H | 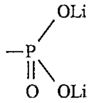 | H | $OCH_3$ | H | 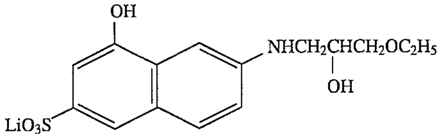 |
| 4. | H | 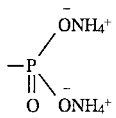 | H | $OCH_3$ | $OCH_3$ | 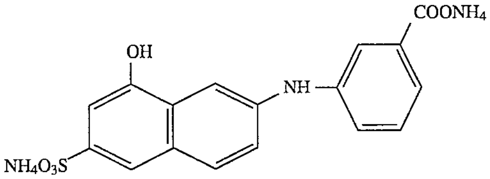 |
| 5. | H | $COONH_4$ | H | $OC_2H_5$ | $OC_2H_5$ | 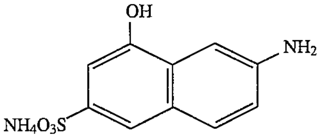 |
| 6. | H | 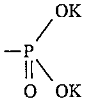 | COOK | $OCH_3$ | $OCH_3$ | 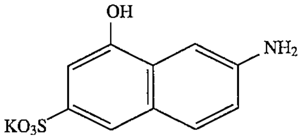 |
| 7. | H | 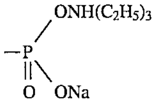 | COOK | $OCH_3$ | $OCH_3$ | 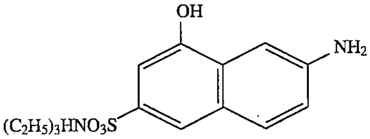 |
| 8. | H | 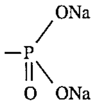 | COONa | $CH_3$ | $OCH_3$ | 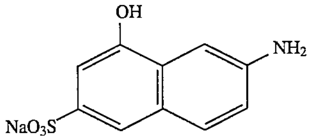 |

-continued
| | $R^1$ | $R^2$ | $R^3$ | $R^4$ | $R^5$ | Ar |
|---|---|---|---|---|---|---|
| 9. | H | 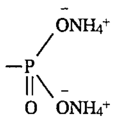 | $COONH_4$ | $OCH_3$ | $OCH_3$ | 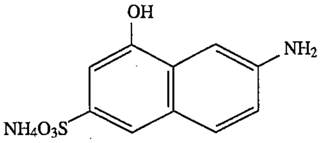 |
| 10. | H | 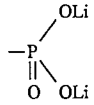 | COOLi | $OC_2H_5$ | $OC_2H_5$ | 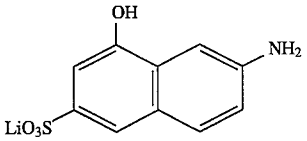 |
| 11. | H | 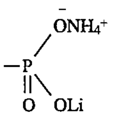 | COOLi | $OC_2H_5$ | $OC_2H_5$ | 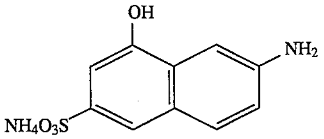 |
| 12. | H | 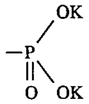 | $SO_3K$ | $OCH_3$ | $C_2H_5$ | 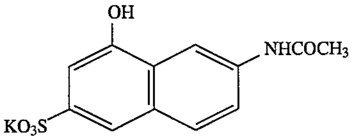 |
| 13. | COOLi | COOLi | H | $CH_3$ | $OC_2H_5$ | 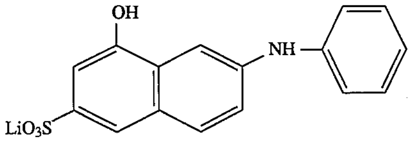 |
| 14. | H | COOMo | COOH | $OCH_3$ | $OCH_3$ | 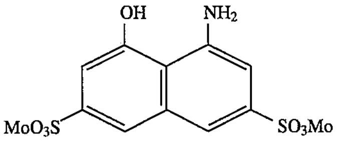 |
| 15. | H | 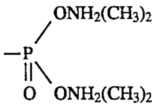 | H | $CH_3$ | $OC_2H_5$ | 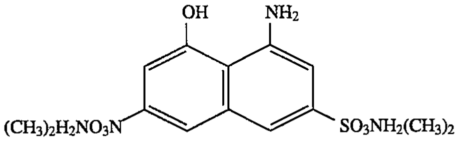 |
| 16. | H | 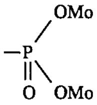 | COOH | $OCH_3$ | $OCH_3$ | 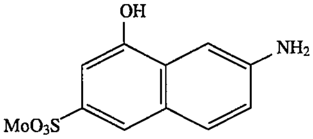 |
| 17. | H | 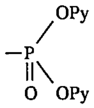 | COOH | $OC_2H_5$ | $OC_2H_5$ | 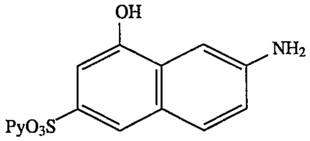 |
| 18. | H | 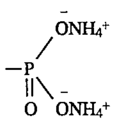 | $SO_3NH_4$ | $OC_2H_5$ | $OC_2H_5$ | 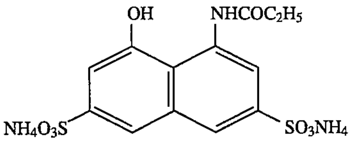 |
| 19. | H | 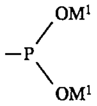 | COOH | $OC_2H_5$ | $OC_2H_5$ | 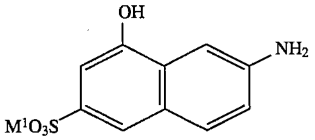 |

-continued

| | $R^1$ | $R^2$ | $R^3$ | $R^4$ | $R^5$ | Ar |
|---|---|---|---|---|---|---|
| 20. | $NH_2$ | 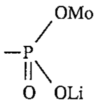  | COOLi | $OCH_3$ | $OCH_3$ | 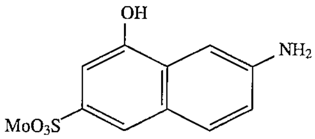  |
| 21. | H | 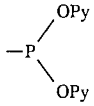  | COOH | H | $OC(CH_3)_3$ | 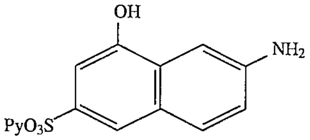  |
| 22. | H | 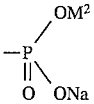  | COOH | $OCH_3$ | $OCH_3$ | 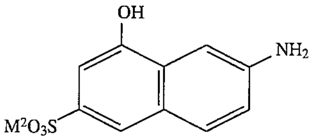  |
| 23. | H | 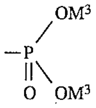  | H | $CH_3$ | $OC_4H_9$ | 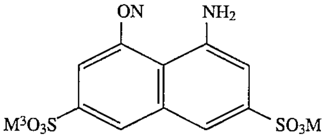  |

(Mo: morpholinium)
(Py: piperidinium)
($M^1$: $HOH_4C_2N(CH_3)_3$)
($M^2$: $HN(CH_3)_3$)
($M^3$: $H_2N(CH_3)_2$)

Compounds represented by the formula (I) can be produced through diazotization and coupling by a well known method described in, for example, Yutaka Hosoda, "Shinsenryo Kagaku" (Gihodo).

A specific production process is as given in the following scheme:

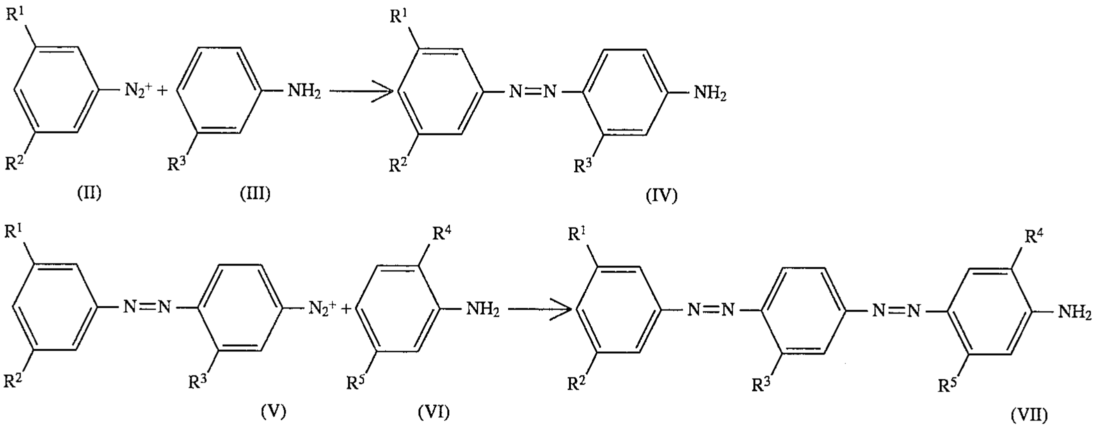

-continued

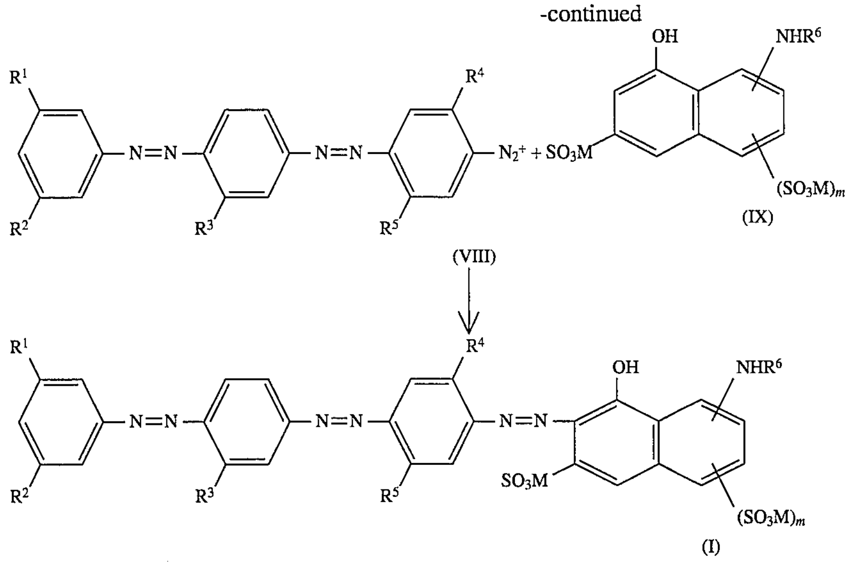

In the method, mono-azo compounds of formula (IV) in the scheme may be prepared from diazonium compounds of formula (II) by reaction with compounds of formula (III) in water at a temperature of 0° to 5° C. for 40 minutes to 2.5 hours.

Further, compounds of formula (VII) in the scheme may be prepared from compounds of formula (V), which may be prepared from compounds of formula (IV) by a conventional diazotization process, by reaction with compounds of formula (VI) under the similar condition of the above mono-azo compounds preparation process.

The compounds of formula (I) may be then prepared from compounds of formula (VIII), which may be prepared from compounds of formula (VII) by a conventional diazotization process, by reaction with compounds of formula (IX) at a temperature of 5° to 10° C. for 1 to 2 hours.

The amount of the dye represented by the formula (I) in the ink is determined depending upon, for example, the kind of the solvent and properties required of the ink. When the ink is used in ink jet recording, the amount of the dye is preferably 1 to 10% by weight, still preferably 2 to 8% by weight. The above amount of the dye of the formula (I) may provide good image density and image quality and good printing properties free from clogging.

According to a preferred embodiment of the present invention, the ink composition further comprises a nonionic acetylene glycol surfactant and a glycol ether. The addition of these compounds results in the formation of dots having a high roundness without sacrificing the color development. Further, the resultant print has a satisfactory drying property and a high image quality.

Suitable nonionic acetylene glycol surfactants used in the present invention include, for example, Surfynol 465, Surfynol TG, and Surfynol 104 (all manufactured by Air Products and Chemicals) with Surfynol TG being particularly preferred. The amount of the surfactant added is preferably 0.05 to 3% by weight, still preferably 0.8 to 2% by weight. It is also preferred to add, as the surfactant, a nonionic surfactant such as a polyoxyethylene alkyl ether or a polyoxyethylene fatty acid ester.

Suitable glycol ethers used in the present invention include, for example, ethylene glycol monomethyl ether, ethylene glycol monobutyl ether, diethylene glycol monobutyl ether, triethylene glycol monobutyl ether, propylene glycol monobutyl ether, dipropylene glycol monomethyl ether, and dipropylene glycol monobutyl ether. The amount of the glycol ether added is preferably 3 to 30% by weight, still preferably 5 to 15% by weight.

Further, according to a preferred embodiment of the present invention, the ink composition further comprises a polyhydric alcohol. The addition of the polyhydric alcohol can result in a further improvement in moisture retention and prevention of clogging.

Suitable polyhydric alcohols used in the present invention include, for example, glycols, such as, ethylene glycol, diethylene glycol, triethylene glycol, polyethylene glycol, and propylene glycol, 1,3-propanediol, 1,5-pentanediol, 1,2,6-hexanetriol, and glycerin. They may be used alone or as a mixture of two or more. The amount of the polyhydric alcohol added is 1 to 30% by weight, preferably 3 to 20% by weight.

Furthermore, according to a preferred embodiment of the present invention, the ink composition further comprises a nitrogen-containing cyclic compound. The addition of the nitrogen-containing cyclic compound can result in improved water resistance of the print, image quality, and stability of the ink composition. In particular, the nitrogen-containing cyclic compound can enhance the dissolution stability of the dye and the printing stability and, at the same time, can function as an auxiliary color development agent and an auxiliary agent for imparting water resistance. Thus, it is useful in the ink composition of the present invention.

Suitable nitrogen-containing cyclic compounds used in the present invention include, for example, imidazolidinones (e.g., 1,3-dimethyl-2-imidazolidinone), pyrrolidones (e.g., 2-pyrrolidone and N-methyl-2-pyrrolidone), and caprolactams (e.g., ε-caprolactam). They may be used alone or as a mixture of two or more. The amount of the nitrogen-containing cyclic compound added is 1 to 30% by weight, preferably 3 to 20% by weight.

Furthermore, according to a preferred embodiment of the present invention, the ink composition preferably contains a monohydric lower alcohol, such as ethanol, 1-propanol, or 2-propanol, or an anionic surfactant, such as a salt of a fatty acid or a salt of an alkyl sulfate ester, in order to accelerate drying of the ink after the formation of an image. The amount of the lower alcohol is 2 to 10% by weight, preferably 2 to 6% by weight, based on the ink. The amount of the surfactant is preferably 0.01 to 2% by weight based on the ink.

Further, if necessary, thiodiglycol, amines, such as triethanolamine and diethanolamine, fluoro and silicone surfactants, water-soluble polymers, water-soluble resins, antifoaming agents, pH adjustors, mildewproofing agents and the like may be added to the ink composition of the present invention.

The ink composition of the present invention can be prepared by a conventional method. For example, it can be prepared by sufficiently mixing and dissolving ingredients in one another, filtering the resultant solution under pressure through a membrane filter having a pore diameter of 0.8 μm, and deaerating the filtrate by means of a vacuum pump.

The ink composition of the present invention can be most effectively used in the conventional ink jet recording apparatus. It, however, is not limited to the use therein and can also be used in general writing utensils, recorders and pen plotters, The ink jet recording system may be any conventional one, and, in-particular, a method wherein droplets are ejected by taking advantage of vibration of a piezoelectric device and a method wherein thermal energy is utilized can provide excellent image recording.

EXAMPLES

The present invention will now be described in more detail with reference to the following examples and comparative examples, though it is not limited by these examples only.

Preparation of Compound No. 9

Into water (500 ml), m-aminobenzenephosphonic acid (87.0 g) was suspended with stirring. To the mixture, 35% hydrochloric acid (101.3 g) was added, and the mixture was cooled to 0° C. While the solution was maintained at a temperature below 5° C., 36% sodium nitrite (105.4 g) was added dropwise to the solution. The mixture was stirred for 50 minutes to diazotize m-aminobenzenephosphonic acid. Thiourea was then added to the resulting aqueous solution, and the unreacted nitrite was removed to give a diazotized compound containing solution. On the other hand, 3-aminobenzoic acid (58.6 g) was dispersed into methanol (800 ml) and heated to 55° C. to form a solution containing a coupling compound, which was then cooled to 0° C. The diazotized compound containing solution prepared above was added dropwise while the mixture was maintained at a temperature below 5° C. After stirring the mixture at 3°–5° C. for 18 hours, the resulting precipitates were collected by filtration, washed with water to give a monoazo compound, m-(2-carboxy-4-amino-phenylazo)benzenephosphonic acid in a yield of about 125.3 g.

A 64.2 g portion of the monoazo compound thus obtained was dispersed into water (700 ml), and 45% aqueous sodium hydroxide solution (35.6 g) was added to form a solution, to which 36% aqueous sodium nitrite (42.2 g) was added. The mixture was cooled to 5° C., and 20% hydrochloric acid (127.6 g) was added slowly while the mixture was maintained at a temperature below 10° C. The mixture was then stirred at a temperature below 10° C. for 80 minutes to diazotize the monoazo compound. Sulfamic acid was added to the aqueous solution thus obtained, and the unreacted nitrite was removed to give a diazonium compound solution. On the other hand, 2,5-dimethoxyaniline (30.6 g) was dissolved in methanol (600 ml) to give a coupling compound containing solution. The coupling compound containing solution was cooled to a temperature below 0° C., and the diazonium compound containing solution prepared above was slowly added dropwise to the coupling compound containing solution, while the mixture was maintained at a temperature below 5° C. The mixture was stirred at 5°–8° C. for 18 hours. The deposits were collected by filtration and washed with water to give a disazo compound, m-(2-carboxy-4-(2,5-dimethoxy-4-aminophenylazo)phenylazo)benzenephosphonic acid in a yield of about 82.6 g.

The disazo compound thus obtained (72.8 g) was dispersed into water (700 ml), and 45% aqueous solution was added. To this solution, 36% aqueous sodium nitrite solution (32.6 g) was added, and the mixture was cooled to 5° C., to which 20% hydrochloric acid (82.0 g) was added slowly while the mixture was maintained at a temperature below 10° C. The resulting mixture was stirred at a temperature below 10° C. for 90 minutes to diazotize the disazo intermediate. Sulfamic acid was then added to the aqueous solution thus obtained, and the unreacted nitrite was removed to give a diazonium compound containing solution. On the other hand, gamma acid (1-hydroxy-7-amino-3-naphthylsulfonic acid, 35.9 g) was added to water (600 ml) to form a solution in the presence of 45% aqueous sodium hydroxide solution (30.0 g), which was cooled to 3° C. to prepare a coupler solution. The diazonium compound containing solution prepared above was added to the coupler solution while the reaction is maintained at a temperature below 8° C. and at a pH of 8.5 or more in the presence of 20% aqueous sodium hydroxide solution. The mixture was stirred at 8° C. for 4 hours. Crystalline products were deposited by salting out and acidification, collected by filtration washed and dried to give Compound. No. 9 in a yield of 67.0 g. The compound was dispersed into ion exchanged water, purified and concentrated with a reverse osmotic membrane, and added to aqueous ammonia to give an ammonium salt of Compound No. 9

The compounds No. 1 to 9 and 10 to 23 were prepared in a similar manner as the above Experiments Ink compositions of examples and comparative examples were prepared according to formulations specified in Tables 1 and 2. Numerical values in Tables 1 and 2 represent the contents in % by weight of individual components based on the total amount of the ink, and the balance consists of water.

TABLE 1

| | Ink composition | Ex. A1 | Ex. A2 | Ex. A3 | Ex. A4 | Ex. B1 | Ex. B2 | Ex. B3 | Ex. B4 | Ex. B5 | Ex. B6 |
|---|---|---|---|---|---|---|---|---|---|---|---|
| Dye | Compound No. 3 | | | | | 3 | | | | | |
| | Compound No. 6 | | | | | | 1.8 | 1 | | | |
| | Compound No. 8 | | | | | | | | 2 | | |
| | Compound No. 9 | 3 | 3 | 6 | 6 | | | | 2 | | |
| | Compound No. 11 | | | | | | | | | 2 | |
| | Compound No. 14 | | | | | | | | | | 2.5 |

TABLE 1-continued

| Ink composition | Ex. A1 | Ex. A2 | Ex. A3 | Ex. A4 | Ex. B1 | Ex. B2 | Ex. B3 | Ex. B4 | Ex. B5 | Ex. B6 |
|---|---|---|---|---|---|---|---|---|---|---|
| Compound No. 16 | | | | | | | 1.5 | | | |
| Compound No. 17 | | | | | | | | | | |
| Compound No. 19 | | | | | | | | | | |
| Compound No. 24 | | | | | | | | | | |
| Surfynol 465 | | | | | | | | 0.1 | | |
| Surfynol TG | | | | | | | | | | |
| Diethylene glycol monobutyl ether | | | | | | | | | | |
| Triethylene glycol monobutyl ether | | | | | | | | | | |
| Propylene glycol monobutyl ether | | | | | | | | | | |
| Diethylene glycol | | | | | | | 20 | | | 15 |
| 1,5-Pentanediol | | | | | | 7 | | | | 5 |
| Glycerin | 10 | | 10 | | 5 | 7 | 10 | 10 | 3 | |
| 2-Pyrrolidone | | 10 | | 10 | 5 | | 25 | 10 | | |
| 1,3-Dimethyl-2-imidazolidinone | | | | | | 5 | | | 2 | 10 |
| Ftergent 251 | | | | | | | | | | |
| Triethanolamine | | | | | | | | | 1 | |
| Thiodiglycol | | | | | 1 | | | | | |
| Ethanol | 6 | 6 | 6 | 6 | 5 | | | 6 | 4 | |
| 1-Propanol | | | | | | 4 | | | | 2 |
| Mildewproofing agent | 0.3 | 0.3 | 0.3 | 0.3 | 0.3 | 0.3 | 0.3 | 0.3 | 0.3 | 0.3 |
| Pure water | Balance | Balance | Balance | Balance | Balance | Balance | Balance | Balance | Balance | Balance |

TABLE 2

| Ink composition | Ex. B7 | Ex. B8 | Ex. B9 | Ex. B10 | Ex. C1 | Ex. C2 | Ex. C3 | Ex. C4 | Ex. C5 | Comp. Ex. 1 | Comp. Ex. 2 |
|---|---|---|---|---|---|---|---|---|---|---|---|
| Dye Compound No. 3 | | | | | | | | | | | |
| Compound No. 6 | | | | | | 5 | | | | | |
| Compound No. 8 | | 3.5 | | | | | | | | | |
| Compound No. 9 | | 3 | 8 | | 6 | | | | 8 | | |
| Compound No. 11 | 4 | | | 4 | | | | 6 | | | |
| Compound No. 14 | | | | | | | 8 | | | | |
| Compound No. 16 | | | | | | | | | | | |
| Compound No. 17 | 3.5 | | | 2 | | | | | | | |
| Compound No. 19 | | | | 4 | | | | | | | |
| Compound No. 24 | | | | | | | | | | 3 | 6 |
| Surfynol 465 | 1 | 2 | | | | | | | | | |
| Surfynol TG | | | | | 0.8 | 1.2 | 1 | 0.8 | 2 | | |
| Diethylene glycol monobutyl ether | | | | | 10 | | | 10 | 10 | | 10 |
| Triethylene glycol monobutyl ether | 10 | | 5 | 10 | | 10 | 5 | | | | |
| Propylene glycol monobutyl ether | | | 5 | 10 | | | 5 | | | | |
| Diethylene glycol | 10 | | | | | 15 | 20 | | 15 | | |
| 1,5-Pentanediol | | 8 | 10 | 10 | | 5 | | | | | |
| Glycerin | | 12 | | 5 | 20 | | | 10 | | 10 | 10 |
| 2-Pyrrolidone | 10 | | 5 | 5 | 5 | 3 | 5 | | 5 | | |
| 1,3-Dimethyl-2-imidazolidinone | | 10 | | | | | | 5 | | | 5 |
| Ftergent 251 | | | | | | | | 1 | | | |
| Triethanolamine | | | | 1 | | | | | 1 | | |
| Thiodiglycol | | | 3 | | | | | | | | |
| Ethanol | | | | | | | | | | 6 | |
| 1-Propanol | | | | | | | | | | | |
| Mildewproofing agent | 0.3 | 0.3 | 0.3 | 0.3 | 0.3 | 0.3 | 0.3 | 0.3 | 0.3 | 0.3 | 0.3 |
| Pure water | Balance | Balance | Balance | Balance | Balance | Balance | Balance | Balance | Balance | Balance | Balance |

Among the ink compositions, dye compound Nos. 1 to 23 are dyes of the present invention described in the above table. On the other hand, dye compound No. 24 is a dye which is outside the scope of the present invention and represented by the following formula:

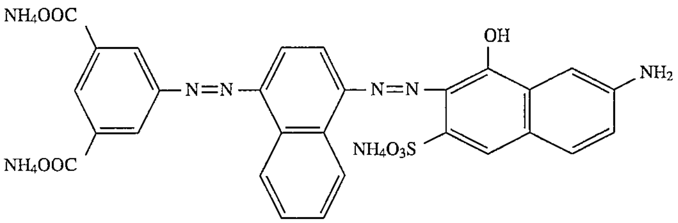

The ink compositions were evaluated as follows.

Ink jet printer MJ-500 (manufactured by Seiko Epson Corporation) was used in the evaluation tests.

Test 1: Water resistance

Alphabetical characters were printed on (1) EPP paper (available from Epson Hanbai Corporation) (acidic paper) and (2) Xerox P (available from Fuji Xerox Co., Ltd.) (neutralized paper). Water droplets were dropped on the print samples, and the print samples were spontaneously dried. The state of the dried samples was inspected with the naked eye and evaluated according to the following criteria:

⊚: The initial state was remained.

○: Characters were legible although slight dissolution of dye was observed.

Δ: Characters were legible although blurring of characters was observed.

X: Characters were illegible with blurring of characters.

Test 2: Image quality

Alphabetical characters and/or graphics were printed on (1) EPP paper, (2) Xerox P, (3) Xerox 4024 (Xerox Co.), and (4) Ricopy 6200 (available from Ricoh Co., Ltd.). The prints were inspected with the naked eye and evaluated according to the following criteria:

⊚: No feathering and high print density were provided.

○: Feathering having no influence on image and high print density were observed, or no feathering and slightly low density were observed.

Δ: No significant feathering was observed with print density being low.

X: Significant feathering or low density was observed.

Test 3: Resumption of successful printing after clogging

The recording head of the printer was filled with an ink. The recording head was shifted from the capping position and, in this state, was allowed to stand at 40° C. for one month. Thereafter, cleaning operation was repeated until normal printing became possible. The number of necessary cleaning operations was evaluated according to the following criteria:

⊚: 0 to 2 times

○: 3 to 5 times

Δ: 5 to 10 times x: Normal printing could not be resumed even after 10 times of cleaning operation.

Test 4: Printing stability

A self-check pattern provided in ink jet printer MJ-500 was continuously printed, and the printing stability was evaluated based on the printing time for which printing could be stably carried out.

⊚: Not less than 24 hr

○: Not less than 10 hr to less than 24 hr x: Less than 10 hr

Test 5: Storage stability

An ink cartridge for printer MJ-500 was filled with an ink and, in this state, was allowed to stand at −30° C. and 70° C. for two weeks. Before and after standing, the ink was inspected for properties, change in color tone, and creation of unfavorable products and precipitates to evaluate the storage stability according to the following criteria.

○: No change in properties and color tone and no unfavorable precipitates were observed.

X: change in properties and color tone was observed, while no unfavorable precipitates was observed.

The results were as given in Tables 3 to 5.

TABLE 3

| | | Ink | | | |
|---|---|---|---|---|---|
| | | Ex. A1 | Ex. A2 | Ex. A3 | Ex. A4 |
| Test 1 Water resistance | (1) | Δ | ⊚ | Δ | ⊚ |
| | (2) | Δ | ⊚ | Δ | ⊚ |
| Test 2 Image quality | (1) | ○ | ⊚ | ○ | ⊚ |
| | (2) | ⊚ | ⊚ | ⊚ | ⊚ |
| | (3) | ⊚ | ⊚ | ⊚ | ⊚ |
| | (4) | ○ | ⊚ | ○ | ⊚ |

TABLE 4

| | | Ink | | | | | | | | | |
|---|---|---|---|---|---|---|---|---|---|---|---|
| | | Ex. B1 | Ex. B2 | Ex. B3 | Ex. B4 | Ex. B5 | Ex. B6 | Ex. B7 | Ex. B8 | Ex. B9 | Ex. B 10 |
| Test 1 | (1) | ○ | ○ | ⊚ | ⊚ | ○ | ⊚ | ⊚ | ○ | ⊚ | ⊚ |
| Water resistance | (2) | ○ | ○ | ⊚ | ⊚ | ⊚ | ⊚ | ⊚ | ⊚ | ⊚ | ⊚ |
| Test 2 | (1) | ⊚ | ○ | ⊚ | ⊚ | ⊚ | ⊚ | ⊚ | ⊚ | ⊚ | ⊚ |
| Image Quality | (2) | ⊚ | ○ | ○ | ⊚ | ⊚ | ⊚ | ⊚ | ⊚ | ⊚ | ⊚ |
| | (3) | ⊚ | ○ | ○ | ⊚ | ⊚ | ⊚ | ⊚ | ⊚ | ⊚ | ⊚ |
| | (4) | ⊚ | ○ | ⊚ | ⊚ | ⊚ | ⊚ | ⊚ | ⊚ | ⊚ | ⊚ |
| Test 3 Resumption of successful printing after clogging | | ⊚ | ⊚ | ⊚ | ⊚ | ⊚ | ⊚ | ⊚ | ⊚ | ⊚ | ⊚ |
| Test 4 Printing stability | | ⊚ | ⊚ | ⊚ | ⊚ | ⊚ | ⊚ | ⊚ | ⊚ | ⊚ | ⊚ |
| Test 5 Storage stability | | ○ | ○ | ○ | ○ | ○ | ○ | ○ | ○ | ○ | ○ |

TABLE 5

| | | Ink | | | | | | |
|---|---|---|---|---|---|---|---|---|
| | | Ex. C1 | Ex. C2 | Ex. C3 | Ex. C4 | Ex. C5 | Comp. Ex. 1 | Comp. Ex. 2 |
| Test 1 Water resistance | (1) | ⊚ | ⊚ | ⊚ | ⊚ | ⊚ | ○ | Δ |
| | (2) | ⊚ | ⊚ | ⊚ | ⊚ | ⊚ | Δ | Δ |
| Test 2 Image Quality | (1) | ⊚ | ⊚ | ⊚ | ⊚ | ⊚ | X | X |
| | (2) | ⊚ | ⊚ | ⊚ | ⊚ | ⊚ | ○ | ○ |
| | (3) | ⊚ | ⊚ | ⊚ | ⊚ | ⊚ | Δ | Δ |
| | (4) | ⊚ | ⊚ | ⊚ | ⊚ | ⊚ | ○ | ○ |
| Test 3 Resumption of successful printing after clogging | | ⊚ | ⊚ | ⊚ | ○ | ○ | Δ | ○ |
| Test 4 Printing stability | | ⊚ | ⊚ | ⊚ | ⊚ | ⊚ | ○ | ○ |
| Test 5 Storage stability | | ○ | ○ | ○ | ○ | ○ | ○ | ○ |

We claim:

1. An ink composition comprising a dye represented by the following formula (I):

(I)

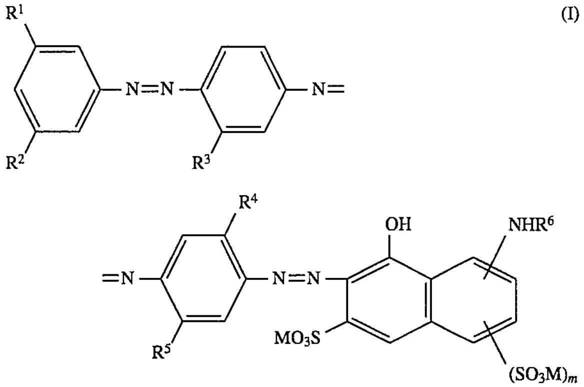

wherein M represents H, an alkali metal, an unsubstituted or substituted ammonium, morpholinium, or piperidinium;

$R^1$ represents H, $NH_2$, or COOM where M is as defined above;

$R^2$ represents COOM or —P(=O)n—$(OM)_2$ where M is as defined above and n is 0 or 1;

$R^3$ represents H, COOM, or $SO_3M$ where M is as defined above;

$R^4$ and $R^5$ each independently represent H, an alkyl group having 1 to 6 carbon atoms, or an alkoxyl group having 1 to 6 carbon atoms;

$R^6$ represents H, a phenyl group which may be substituted, an alkylcarbonyl group, or an alkyl group which may be substituted with a hydroxyl or alkoxyl group; and m is 0 or 1.

2. The ink composition according to claim 1, which further comprises a nonionic acetylene glycol surfactant and a glycol ether.

3. The ink composition according to claim 1 or 2, which further comprises a polyhydric alcohol.

4. The ink composition according to any one of claims 1 to 3, which further comprises a nitrogen-containing cyclic compound.

5. The ink composition according to claim 4, which comprises 1 to 10% by weight of the dye represented by the formula (I), 1 to 30% by weight of the polyhydric alcohol, and 1 to 30% by weight of the nitrogen-containing cyclic compound.

6. The ink composition according to claim 5, which comprises 2 to 8% by weight of the dye represented by the formula (I), 3 to 20% by weight of the polyhydric alcohol, and 3 to 20% by weight of the nitrogen-containing cyclic compound.

7. The ink composition according to any one of claims 1 to 6, comprising at least the dye represented by the formula (I) wherein M represents an unsubstituted or substituted ammonium, morpholinium, or piperidinium.

8. The ink composition according to claim 7, wherein the ratio of the number of M's which are an alkali metal salt to all the number of M's in the dye represented by the formula (I) is not more than 50%.

9. An ink jet recording method comprising the step of projecting an ink composition, according to any one of claims 1 to 8, as liquid droplets through a nozzle to form a print on a recording medium.

10. A printed medium obtained by a method according to claim 9.

* * * * *